April 1, 1930.  A. A. JOHNSON  1,752,385
AUTOMATIC HYDRAULIC TRANSMISSION
Filed Aug. 31, 1929
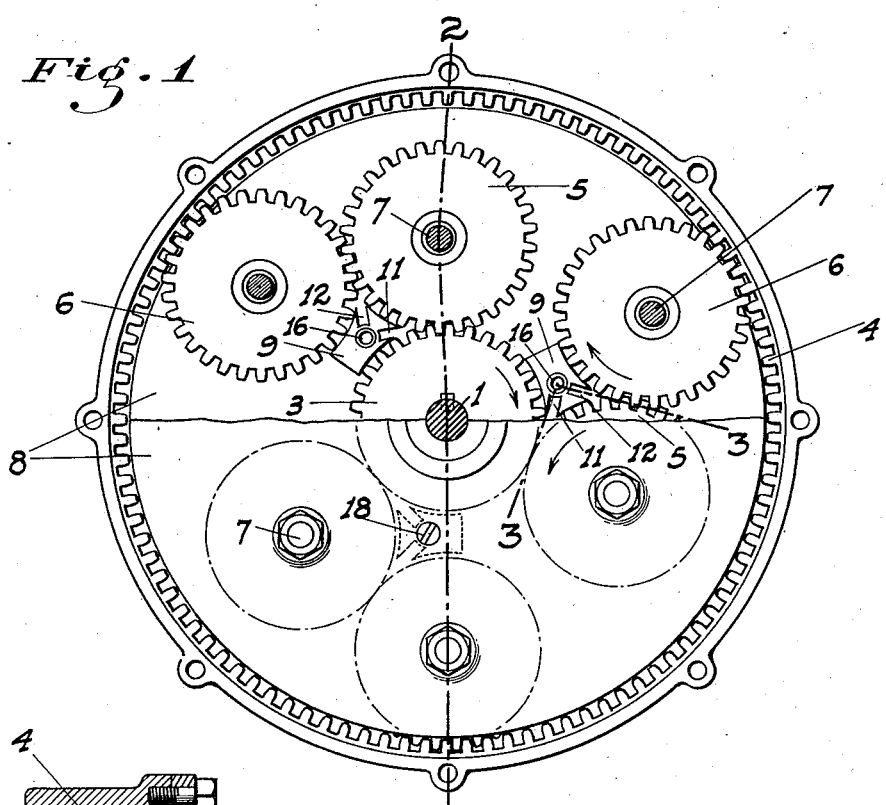
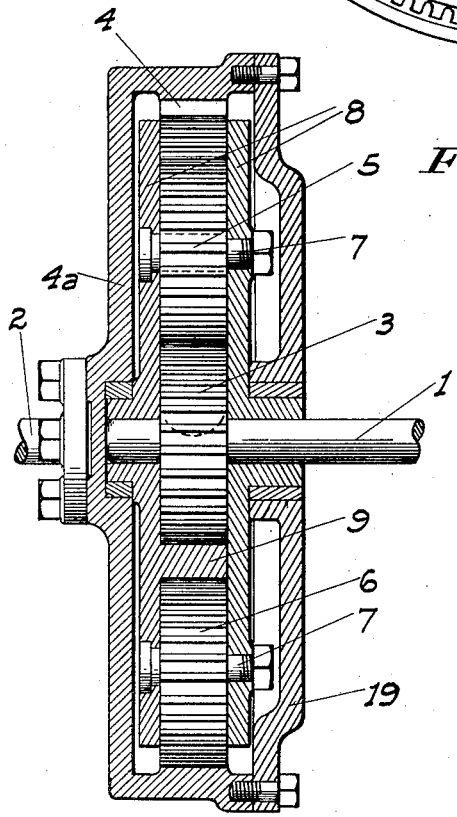
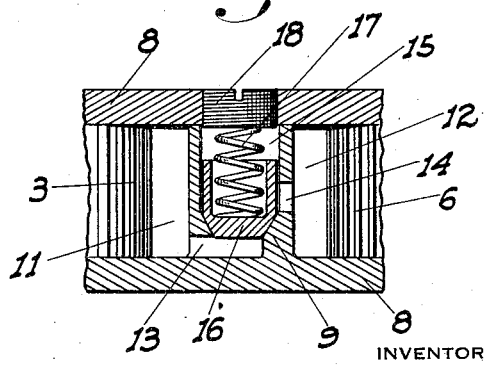
INVENTOR
A. A. Johnson
BY
ATTORNEY Patented Apr. 1, 1930

1,752,385

UNITED STATES PATENT OFFICE

ALFRED A. JOHNSON, OF SACRAMENTO, CALIFORNIA

AUTOMATIC HYDRAULIC TRANSMISSION

Application filed August 31, 1929. Serial No. 389,849.

This invention relates to transmission devices to be interposed between driving and driven shafts, and is particularly intended for use in connection with the gas engines of motor vehicles to take the place of the usual forward speed hand shifted gear transmissions.

The principal object of my invention is to provide a hydraulic controlled transmission mechanism so constructed as to automatically cause the relative speeds of the drive and driven shafts to alter as the load on the latter may require: and so as to permit the drive shaft (to which the engine is connected) to continue to rotate at a relatively high speed at all times, as is necessary for power development with the ordinary gas engine as used in automobiles.

At the same time the construction of the mechanism is such that the extent of speed-change between the driving and driven shafts is limited and the change cannot go beyond such limit. The shafts therefore are always in driving connection with each other and the drive shaft cannot "run away" from the driven shaft and allow the latter to remain stationary. The device therefore does not and is not intended to take the place of a clutch.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a front view of the transmission with the outer cover plate removed and the adjacent inner plate partly broken away.

Fig. 2 is a sectional elevation taken on the line 2—2 of Fig. 1.

Fig. 3 is an enlarged fragmentary section taken on the line 3—3 of Fig. 1.

Referring now more particularly to the characters of reference on the drawings, the numeral 1 denotes the drive shaft adapted to be connected to a clutch, and 2 is the driven shaft longitudinally alined therewith and adapted to be connected to a reverse gear of suitable character; the transmission structure being connected to these shafts and being interposed in the drive between the reverse gear and clutch.

The drive shaft has a spur gear 3 fixed thereon, while the driven shaft is fixed to a relatively large internal gear 4. Meshing with the gear 3 but not with the internal gear are a plurality of pinions 5 spaced circumferentially about said gear 3. Meshing with the pinions 5 and with the internal gear but not with the central gear 3 are other pinions 6. The pinions 5 and 6 turn on shafts 7 which are fixed in spaced plates 8 turnable on the shaft 1, the gear 3 and the pinions 5 and 6 fitting closely between said plates.

Extending between the plates 8 and fixed therewith are blocks 9 having a close fit with the outer edges of the teeth of each set of pinions and the gear 3. Each block is provided with opposed passages 11 and 12 leading from and open to the space between the respective pairs of meshing members (5 and 6 and 3 and 5 respectively) to separate ports 13 and 14 respectively, which communicate at different levels with a bore or chamber 15 formed in the block with its longitudinal axis parallel to the axes of the pinions and shafts. A taper valve 16 is slidable in said bore and is normally held closed by a stiff spring 17 whose pressure may be regulated by an adjustable plug 18 mounted in one of the plates 8. The valve is arranged so as to normally prevent communication between the ports 13 and 14 and the corresponding passages; such communication being only established when the resistance of the spring is overcome.

The passages 11 and 12 preferably extend for the full width of the pinions, the passage 11 of each block being considered as the intake passage to the valve and the passage 12 the discharge passage therefrom. The passage 12 is disposed substantially tangent to the pinions 5 and 6, while the passage 11 is disposed tangent to the members 3 and 5.

The direction of rotation of the driven shaft 1 and the gear 3 is such that the meshing portions of the members 3 and 5 turn away from the passage 11, while the meshing portions of the pinions 5 and 6 turn toward the passage 12. The space between the plates 8 is adapted to be filled with oil, and to keep the oil from being dissipated one of the side webs 4$^a$ of the internal gear extends to the shaft 2 in the form of a solid plate, and another solid plate 19 is secured to the opposite side edge of the internal gear so that an oil-tight chamber is formed in which the plates 8 and the various gears and pinions are enclosed.

In operation the rotation of the drive shaft and gear 3 tends to rotate the pinions 5 and 6, and consequently the internal gear and the driven shaft. If there were no oil in the casing the internal gear would not rotate as the pinions 5 and 6 would be free to rotate. With the casing filled with oil however the rotation of the gear 3 drives the oil past the adjacent side walls of the blocks into the passages 11. The oil cannot pass from said passages between the meshing teeth of the members 3 and 5, and can therefore only leave said chamber by overcoming the resistance of the valve spring 17 and flowing from said intake passages 11 to the discharge passages 12. If the resistance to turning of the internal gear and driven shaft is less than the resistance of the valve spring, the valve will not be opened and the oil confined within the intake passages 11 causes a positive lock between the various pinions to be had. The drive shaft, the pinion units, and the internal gear and drive shaft then turn together as a unit or at the same time, or what corresponds to the high or direct gear drive of the ordinary transmission.

If, however, the resistance to turning of the driven shaft is relatively great, as when starting the vehicle or ascending a grade, the oil pressure confined within the passages 11 overcomes the resistance of the valve springs, the valves are opened and the oil circulates from the passages 11 to the passages 12 and thence into the main casing area or oil reservoir from between the teeth of the pinions 6 and the corresponding side faces of the blocks 9. The previous lock between the pinions is therefore broken as the oil pressure is thus relieved and the pinions rotate relative to the gear 3, causing the internal gear to be driven at a different speed from that of the drive shaft. The extent of such difference of course depends upon the relative freedom of rotation of the pinions 5 and 6 relative to the gear 3, which depends on the extent of opening of the valves. This in turn depends on the resistance offered by the internal gear and driven shaft, since the greater such resistance the greater will be the opening of the valves and the more rapid will be the flow of oil, while the oil pressure will be consequently relieved more freely and rapidly. When the resistance of the internal gear and driven shaft is reduced or becomes less than the resistance of the valve springs the valves automatically close and the shafts again turn together at the same speed.

From the foregoing description it will be readily seen that I have produced such a device as substantially fulfills the objects of the invention as set forth herein.

While this specification sets forth in detail the present and preferred construction of the device, still in practice such deviations from such details may be resorted to as do not form a departure from the spirit of the invention, as defined by the appended claims.

Having thus described my invention what I claim as new and useful and desire to secure by Letters Patent is:

1. A hydraulic-controlled transmission structure including alined drive and driven shafts, a gear on the drive shaft, an internal gear on the driven shaft, a pinion meshing with the gear, another pinion meshing with said first pinion and internal gear, plates between which said pinions are closely disposed and on which they are mounted, said plates being turnable about the drive shaft as an axis, the space between the plates forming an oil chamber, restricted oil passage means from said space to the intermeshing portions of the gear and adjacent pinion, another passage between both said intermeshing portions, a valve in said last named passage, and a spring resisting the opening of the valve.

2. A hydraulic-controlled transmission structure including alined drive and driven shafts, a gear on the drive shaft, an internal gear on the driven shaft, a pinion meshing with the gear, another pinion meshing with said first pinion and internal gear, plates between which said pinions are closely disposed and on which they are mounted, said plates being turnable about the drive shaft as an axis, the space between the plates forming an oil chamber, a block extending between the plates and disposed between said gear and pinions, the side walls of the block having a close running fit with the teeth of the gear and pinions, passage means in said block between the meshing portions of the pinions and the gear and the corresponding pinions, a normally closed valve in said passage means, and a spring resisting the opening of the valve.

3. A hydraulic-controlled transmission structure including alined drive and driven shafts, a gear on the drive shaft, an internal gear on the driven shaft, a pinion meshing with the gear, another pinion meshing with said first pinion and internal gear, plates between which said pinions are closely disposed and on which they are mounted, said plates being turnable about the drive shaft as an axis, the space between the plates forming an oil chamber, restricted oil passage means from said space to the intermeshing portions of the gear and adjacent  nion, another passage between both said intermeshing portions, and means automatically preventing a flow of oil through said last named passage unless the resistance to turning of the driven shaft exceeds a predetermined amount.

4. A hydraulic-controlled transmission structure including alined drive and driven shafts, a gear on the drive shaft, an internal gear on the driven shaft, a pinion meshing with the gear, another pinion meshing with said first pinion and internal gear, plates between which said pinions are closely disposed and on which they are mounted, said plates being turnable about the drive shaft as an axis, and hydraulic control means associated with said plate and the pinions and gear to automatically lock the gears and pinion against rotation relative to each other unless the resistance to turning of the driven shaft and internal gear exceeds a predetermined amount.

In testimony whereof I affix my signature.

ALFRED A. JOHNSON.